(12) United States Patent
Sinha

(10) Patent No.: US 9,476,998 B2
(45) Date of Patent: Oct. 25, 2016

(54) HYDRAULIC FRACTURE CHARACTERIZATION USING BOREHOLE SONIC DATA

(75) Inventor: Bikash K. Sinha, Cambridge, MA (US)

(73) Assignee: Schlumberger Technology Corporation, Houston, TX (US)

( * ) Notice: Subject to any disclaimer, the term of this patent is extended or adjusted under 35 U.S.C. 154(b) by 627 days.

(21) Appl. No.: 13/992,752

(22) PCT Filed: Dec. 16, 2011

(86) PCT No.: PCT/US2011/065404
§ 371 (c)(1),
(2), (4) Date: Jun. 27, 2013

(87) PCT Pub. No.: WO2012/087796
PCT Pub. Date: Jun. 28, 2012

(65) Prior Publication Data
US 2013/0289881 A1    Oct. 31, 2013

Related U.S. Application Data

(60) Provisional application No. 61/425,496, filed on Dec. 21, 2010.

(51) Int. Cl.
| | |
|---|---|
| *G01V 1/00* | (2006.01) |
| *G01V 1/30* | (2006.01) |
| *G01V 1/50* | (2006.01) |
| *E21B 43/26* | (2006.01) |
| *G01V 1/28* | (2006.01) |

(52) U.S. Cl.
CPC ............. *G01V 1/306* (2013.01); *E21B 43/26* (2013.01); *G01V 1/50* (2013.01); *G01V 1/284* (2013.01); *G01V 2210/6242* (2013.01); *G01V 2210/646* (2013.01)

(58) Field of Classification Search
CPC .... E21B 33/124; E21B 43/26; E21B 47/101; G01V 1/46; G01V 1/48
See application file for complete search history.

(56) References Cited

U.S. PATENT DOCUMENTS

| | | | |
|---|---|---|---|
| 4,870,627 A | 9/1989 | Shu et al. | |
| 6,611,761 B2 | 8/2003 | Sinha et al. | |

(Continued)

FOREIGN PATENT DOCUMENTS

| | | |
|---|---|---|
| WO | 2010/111077 | 9/2010 |
| WO | 2011/051782 | 5/2011 |

OTHER PUBLICATIONS

Sinha et al. 'Estimation of Formation Stresses Using Borehole Sonic Data', May 25-28, 2008, pp. 1-16.*

(Continued)

*Primary Examiner* — Elias Desta
(74) *Attorney, Agent, or Firm* — Daryl R. Wright

(57) ABSTRACT

A method and apparatus for assessing induced fractures in a subterranean formation including acquiring sonic data before and after a hydraulic fracturing operation, calculating a shear modulus in the borehole cross-sectional plane from Stoneley data, and calculating two shear moduli in two borehole orthogonal axial planes from cross dipole data. A method and apparatus for assessing induced fractures in a subterranean formation including collecting sonic data before and after fracturing the formation, calculating a far-field shear modulus in the borehole cross-sectional plane and a far-field shear moduli in the two orthogonal borehole axial planes, inferring the open or closed status of a fracture, and estimating a radial width or height or both of a vertical fracture.

18 Claims, 16 Drawing Sheets

(56) References Cited

U.S. PATENT DOCUMENTS

| | | |
|---|---|---|
| 6,718,266 B1 | 4/2004 | Sinha et al. |
| 2006/0256656 A1 | 11/2006 | Sinha et al. |
| 2010/0157737 A1 | 6/2010 | Miller et al. |
| 2010/0250214 A1* | 9/2010 | Prioul .................... G01V 1/48 703/10 |
| 2011/0172921 A1 | 7/2011 | Valero et al. |
| 2013/0081804 A1 | 4/2013 | Sinha et al. |

OTHER PUBLICATIONS

V. Pistre, et al., "A Modular Wireline Sonic Tool for Measurements of 3D (Azimuthal, Radial, and Axial) Formation Acoustic Properties," Proceedings of the 46th Annual Logging Symposium, Society of Professional Well Log Analysts, Paper P, 2005.

M. Schoenberg and C. Sayers, "Seismic anisotropy of fractured rock," Geophysics, vol. 60, No. 1, pp. 204-211, 1995.

H. Braunisch, et al, "Inversion of guide-wave dispersion data with application to borehole acoustics," J. Acoust. Soc. Am, 115 (1), Jan. 2004, pp. 269-279.

H. Braunisch, et al., "Inversion of borehole dispersions for formation elastic moduli," 2000 IEEE International Ultrasonics Symposium Proceedings, IEEE, New York, pp. 551-556.

J.F. Nye, "Physical Properties of Crystals, Their Representation by Tensors and Matrices," Oxford Science Publications, 1985.

\* cited by examiner

HYDRAULIC FRACTURE CHARACTERIZATION USING BOREHOLE SONIC DATA

PRIORITY

This application claims priority to the filing date of U.S. Provisional Patent Application Ser. No. 61/425,496, filed on Dec. 21, 2011, and entitled, "Hydraulic Fracture Characterization using Borehole Sonic Data," which is incorporated by reference herein in its entirety.

FIELD

This application relates to ways to characterize subterranean formation properties after hydraulic fracturing using sonic data collected from boreholes.

BACKGROUND

Mechanical disturbances can be used to generate elastic waves in earth formations surrounding a borehole, and the properties of these waves can be measured to obtain important information about the formations through which the waves have propagated. Parameters of compressional, shear and Stoneley waves, such as their velocity (or its reciprocal, slowness) in the formation and in the borehole, are indicators of formation characteristics that help in the evaluation of the location and/or producibility of hydrocarbon resources.

An acoustic source in a fluid-filled borehole generates headwaves as well as relatively stronger borehole-guided modes. A standard sonic measurement system consists of placing a piezoelectric source and an array of hydrophone receivers inside a fluid-filled open or cased borehole. The piezoelectric source is configured in the form of either a monopole or a dipole source. The source bandwidth typically ranges from a 0.5 to 20 kHz. A monopole source generates primarily the lowest-order axisymmetric mode, also referred to as the Stoneley mode, together with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. Those refracted along the borehole surface are known as compressional headwaves. The critical incidence angle $\theta_i = \sin^{-1}(V_f/V_c)$, where $V_f$ is the compressional wave speed in the borehole fluid; and $V_c$ is the compressional wave speed in the formation. As the compressional headwave travels along the interface, it radiates energy back into the fluid that can be detected by hydrophone receivers placed in the fluid-filled borehole. In fast formations, the shear headwave can be similarly excited by a compressional wave at the critical incidence angle $\theta_i = \sin^{-1}(V_f/V_s)$, where $V_s$ is the shear wave speed in the formation. Headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole for determining the formation compressional and shear wave speeds. It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of flexural dispersion. There are standard processing techniques for the estimation of formation shear velocities in either fast or slow formations from an array of recorded dipole waveforms.

An example of a logging device that has been used to obtain and analyze sonic logging measurements of formations surrounding an earth borehole is called a SONIC SCANNER™ (trademark of Schlumberger), and is of the general type described in Pistre et al., "A modular wireline sonic tool for measurements of 3D (azimuthal, radial, and axial) formation acoustic properties, by Pistre, V., Kinoshita, T., Endo, T., Schilling, K., Pabon, J., Sinha, B., Plona, T., Ikegami, T., and Johnson, D.", Proceedings of the 46$^{th}$ Annual Logging Symposium, Society of Professional Well Log Analysts, Paper P, 2005 which is incorporated by reference. In conventional use of the SONIC SCANNER™ logging tool, one can present compressional slowness, $\Delta t_c$, shear slowness, $\Delta t_s$, and Stoneley slowness, $\Delta t_{st}$, each as a function of depth, z. Slowness is the reciprocal of velocity and corresponds to the interval transit time typically measured by sonic logging tools.

SUMMARY

Embodiments relate to a method and apparatus for assessing induced fractures in a subterranean formation including acquiring cased-hole sonic data before and after a hydraulic fracturing operation, calculating a shear modulus in the borehole cross-sectional plane from Stoneley data, and calculating two shear moduli in two borehole orthogonal axial planes from cross dipole data. Embodiments relate to a method and apparatus for assessing induced fractures in a subterranean formation including collecting cased hole sonic data before and after fracturing the formation, calculating a far-field shear modulus in the borehole cross-sectional plane and a far-field shear moduli in the two orthogonal borehole axial planes, inferring the open or closed status of a fracture, and estimating a radial width or height or both of a vertical fracture.

FIGURES

FIG. 1: Schematic diagram of a set of vertically aligned fractures with azimuth parallel to the NE45. Cross-dipole sonic data from a vertical borehole in such a fractured formation exhibits non-intersecting dipole flexural dispersions. The fast-shear azimuth is parallel to the fracture plane. Differences between the axial extent of shear slowness anisotropy are indicators of the vertical height of vertical fractures.

FIG. 3 provides a flow-chart showing steps in the inversion of borehole sonic data for estimating radial extent of vertical fractures and distinguishing open versus closed fractures.

Figure 1:
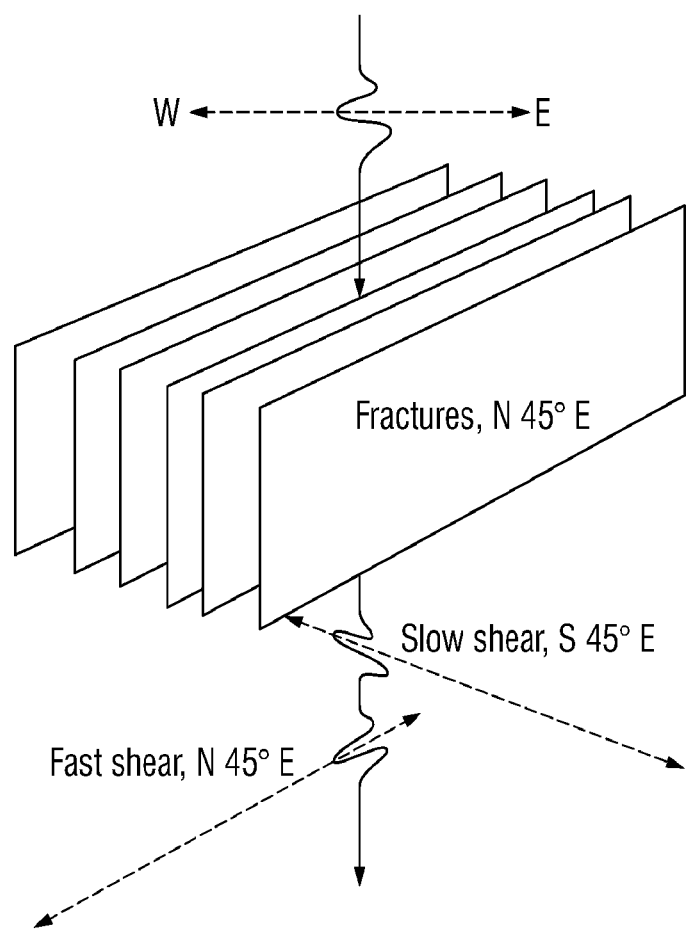
Figure 2:
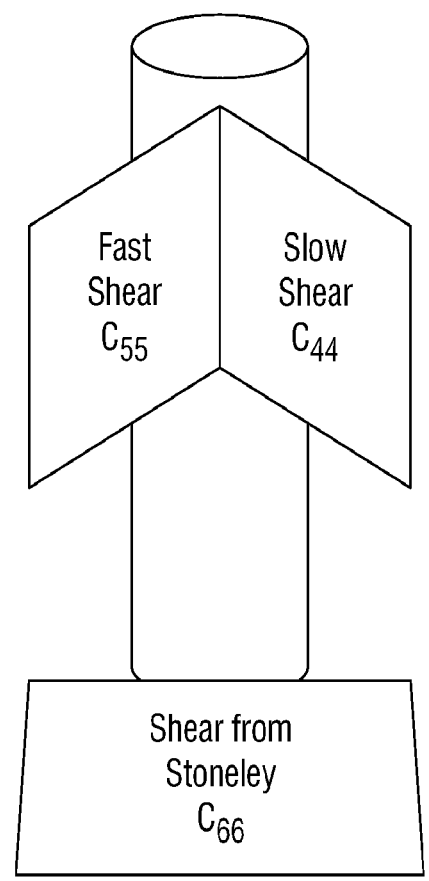
FIG. 2 is a schematic diagram of a dimensional view of relevant planes including fast shear C55, slow shear C44, and shear from Stoneley C66.
Figures 1, 4A:
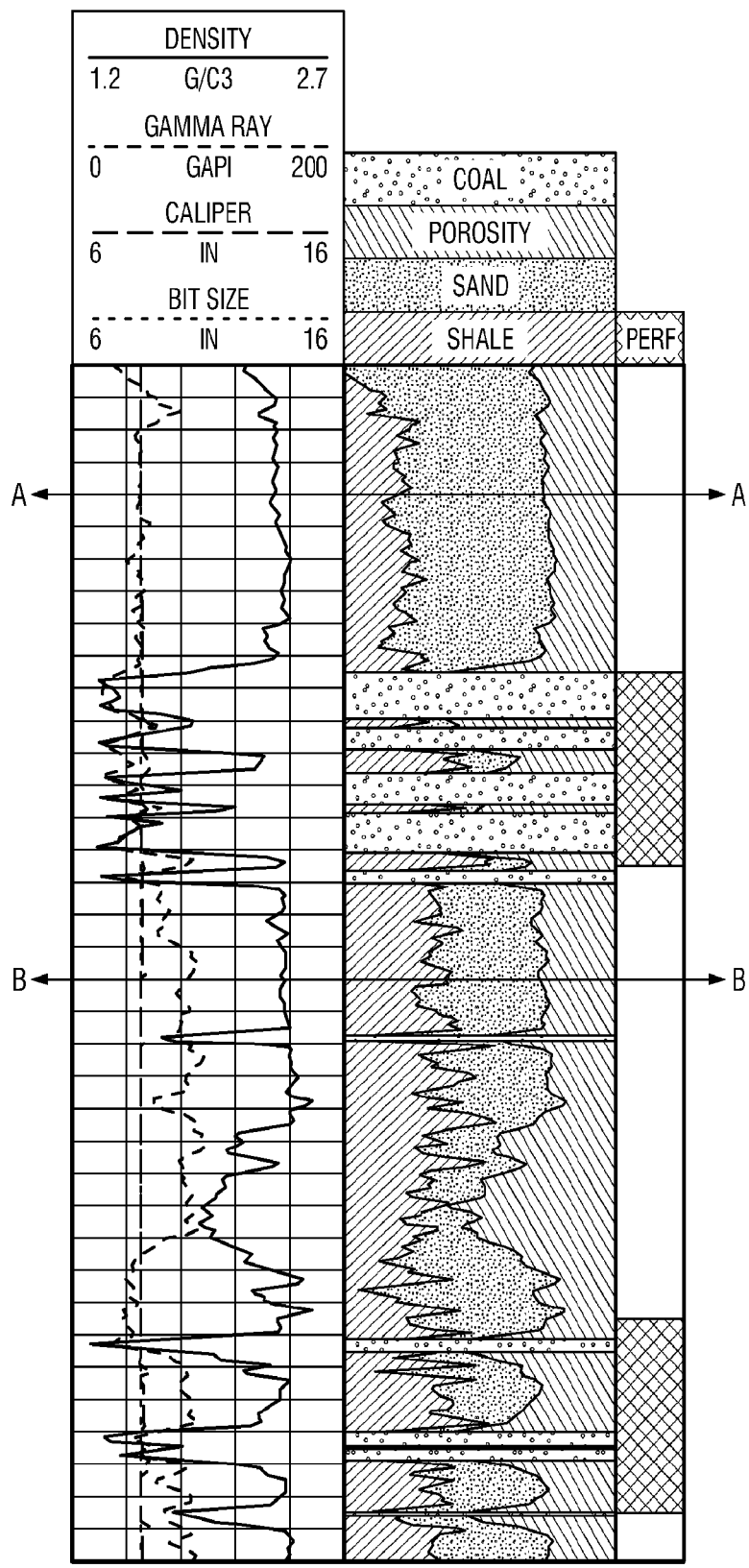
Figures 2, 4A:
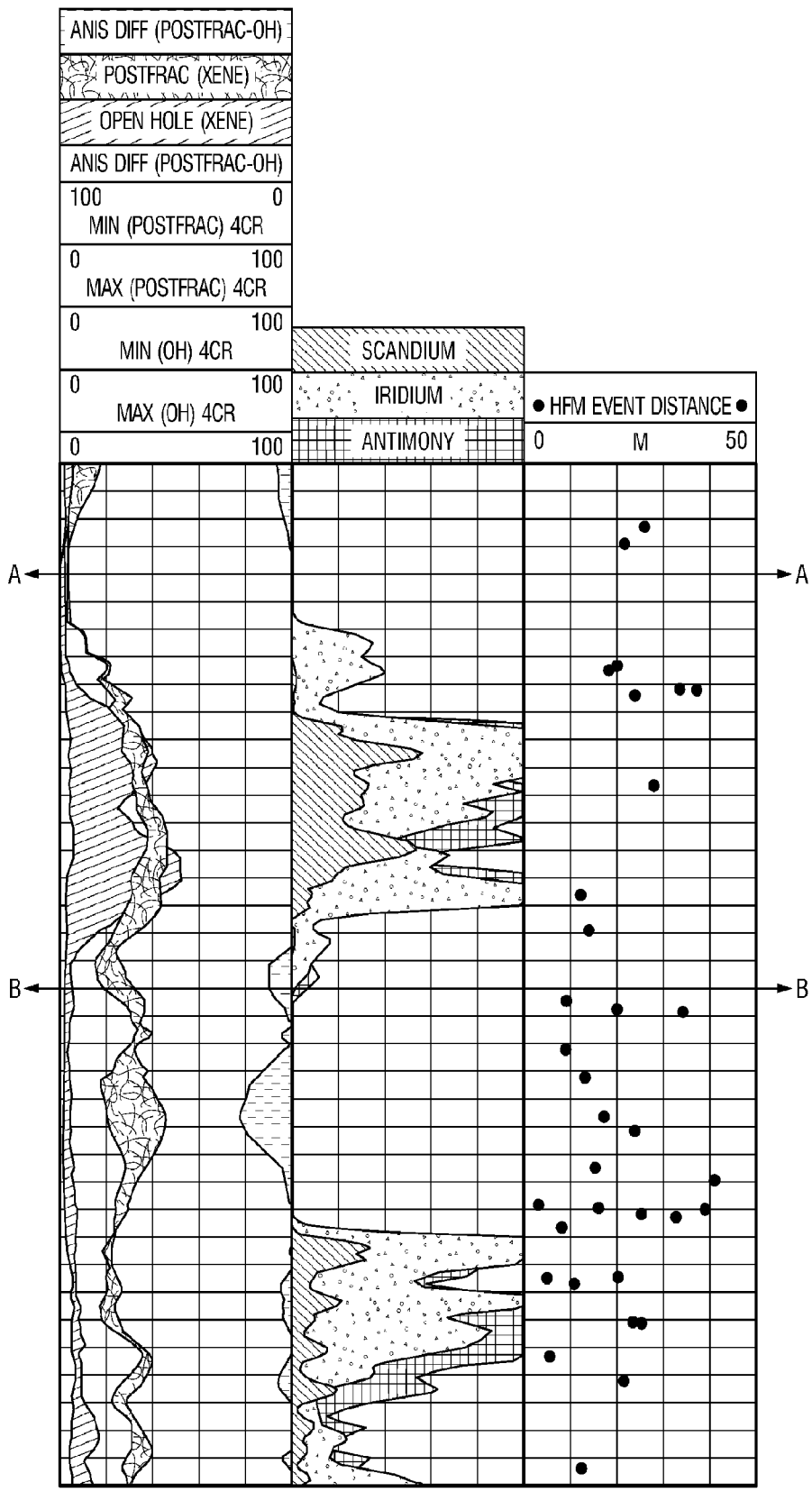

FIG. 4a-1 to 4a-2: Lithology of a coal-bed methane reservoir interval. Vertical red bars denote the perforated intervals. Horizontal lines denote depths where cased-hole sonic data has been analyzed to estimate fracture orientation and distinguish between open and closed fractures.

Figures 1, 4B:
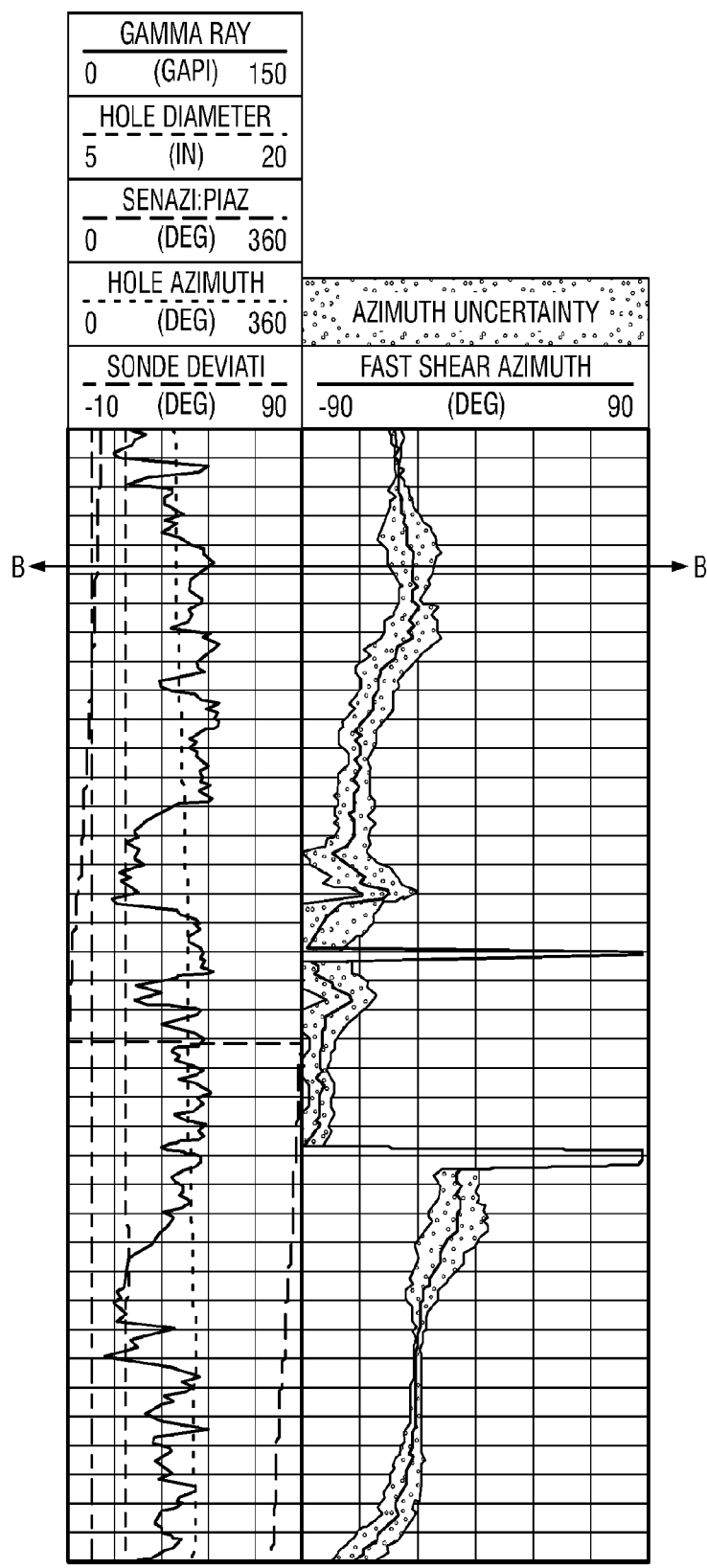
Figures 2, 4B:
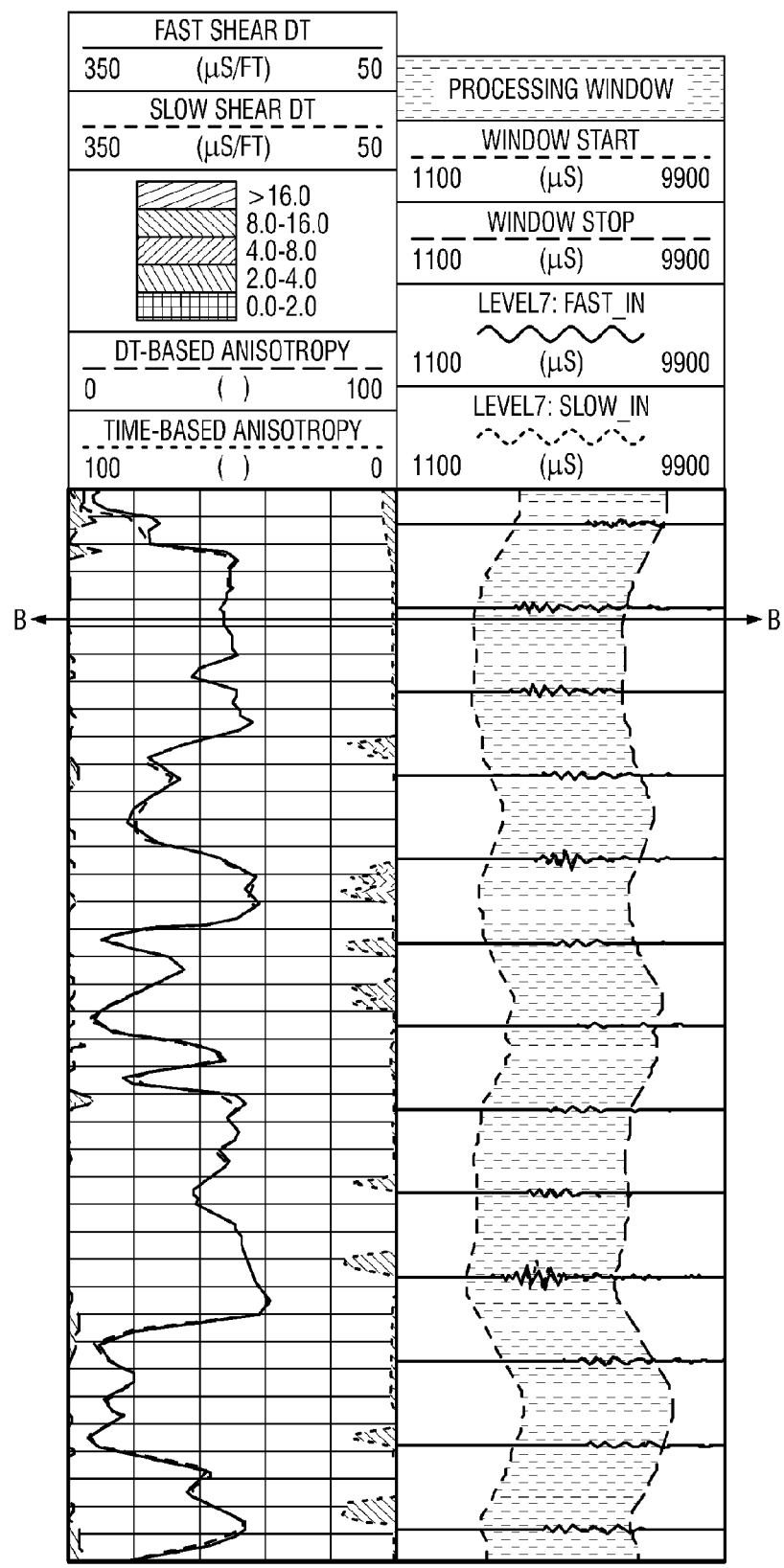

FIG. 4b-1 to 4b-2: Cross-dipole sonic data anisotropy processing results from an open-hole data before fracturing show negligibly small azimuthal shear anisotropy at the depth of subsequent analysis shown by the horizontal red arrow. The fast shear azimuth is approximately NW34 at depth B.

Figures 1, 4C:
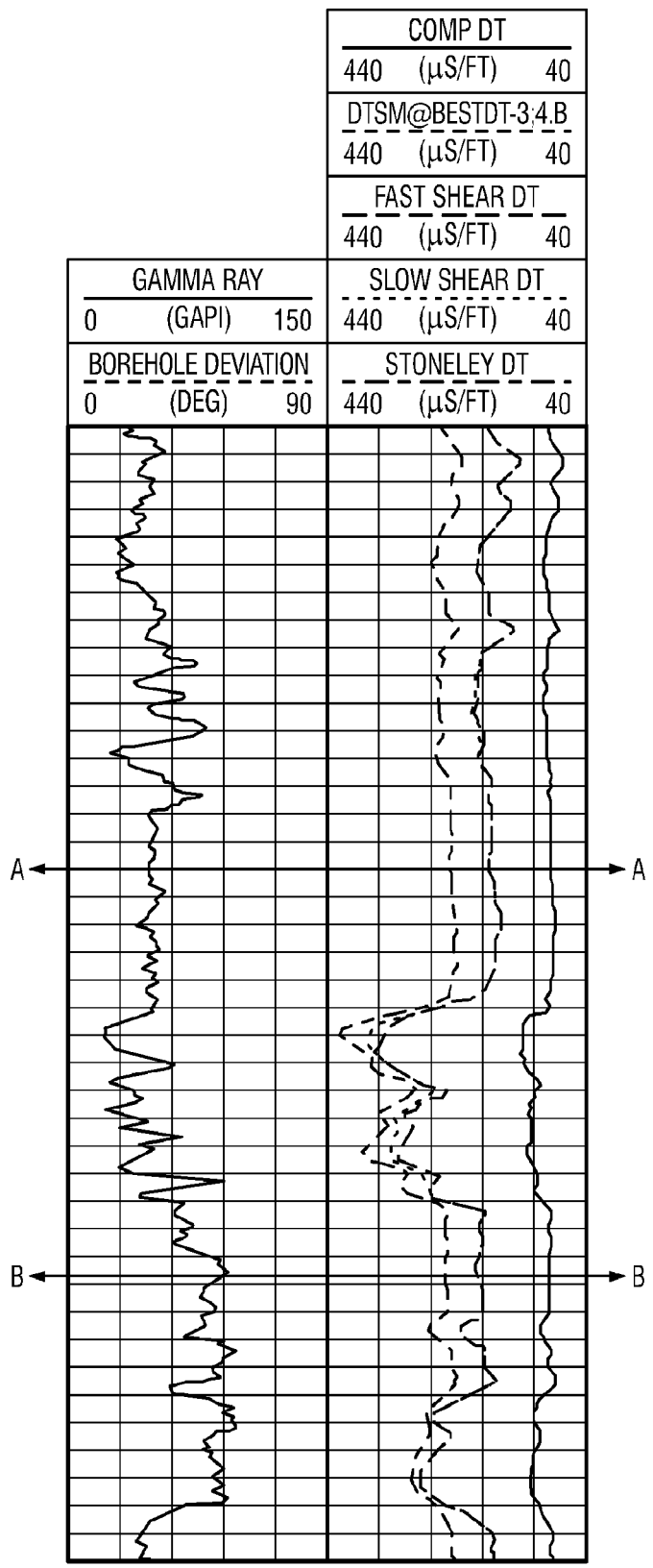
Figures 2, 4C:
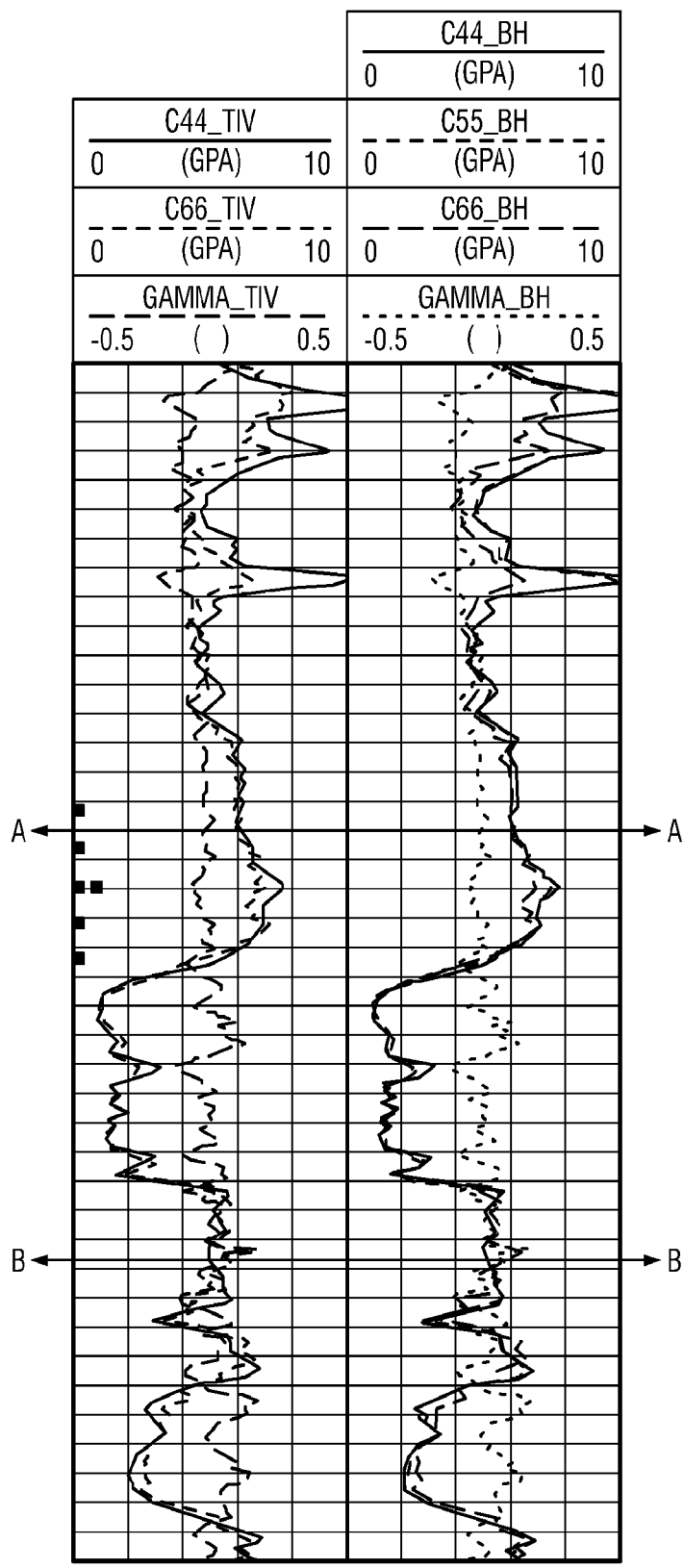

FIGS. 4c-1 to 4c-2: Results from the 3D-anisotropy module suggest the formation at depth A to be nearly isotropic in the open-hole environment before fracturing. A marginal amount of TI anisotropy with a small positive gamma is observed at depth B.

Figure 5A:
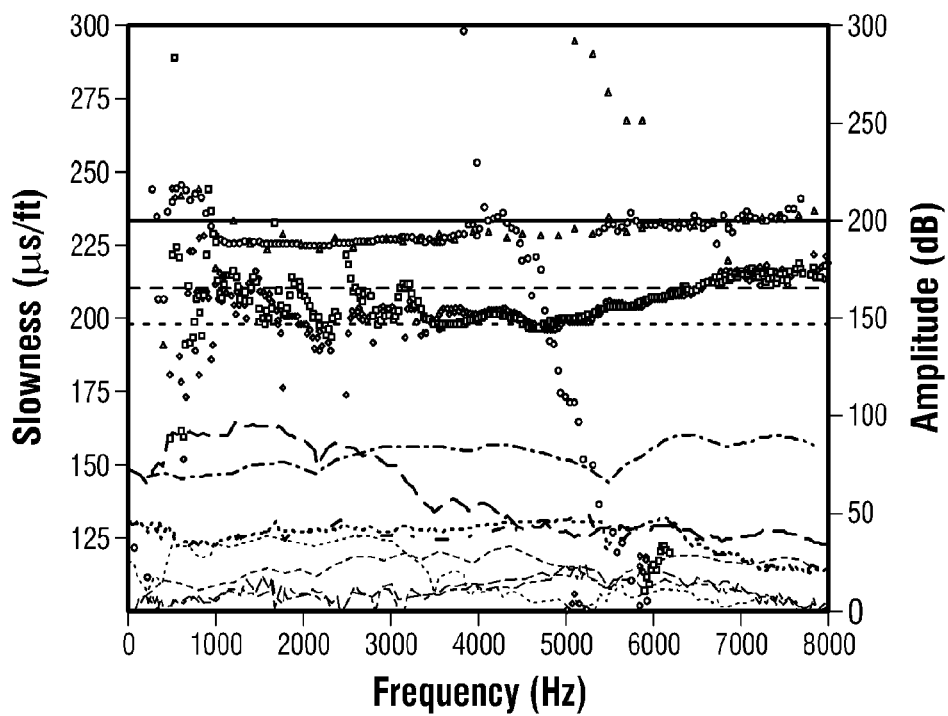

FIG. 5a: Cased-hole (Pre-frac)—Measured Stoneley (in cyan), and cross-dipole dispersions (in red and blue) at depth B.

Figure 5B:
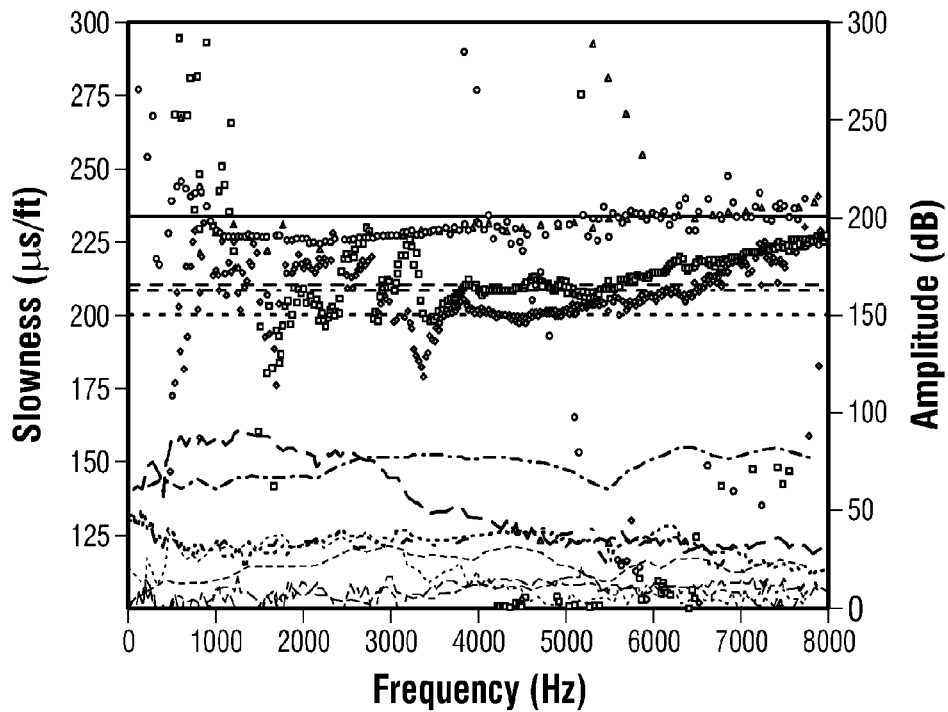

FIG. 5b: Cased-hole (Post-frac)—Measured Stoneley (in cyan), and cross-dipole dispersions (in red and blue) at depth B.

Figure 5C:
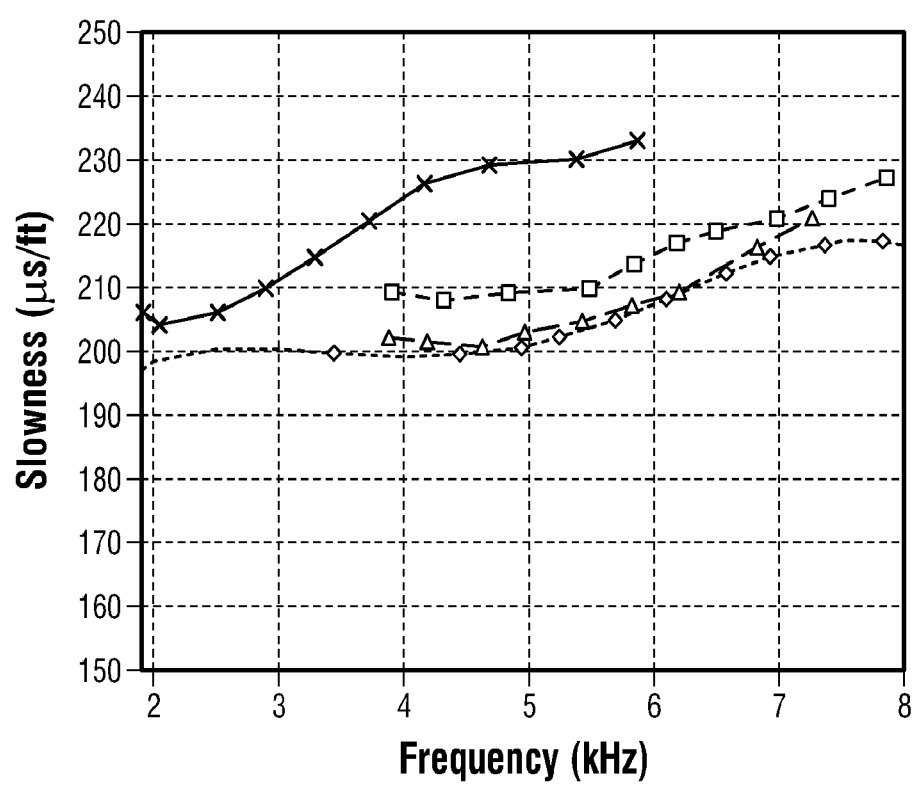

FIG. 5c: Comparison of the dipole flexural dispersions in the open-hole (in black), cased-hole (pre-frac) shown in blue, and cased-hole (post-frac) shown in red at depth B. Notice that changes in the cross-dipole flexural dispersions shown by the red and cyan curves after hydraulic fracturing from the blue curve corresponding to the pre-frac state can be inverted to estimate normal and tangential fracture compliances.

Figure 6A:
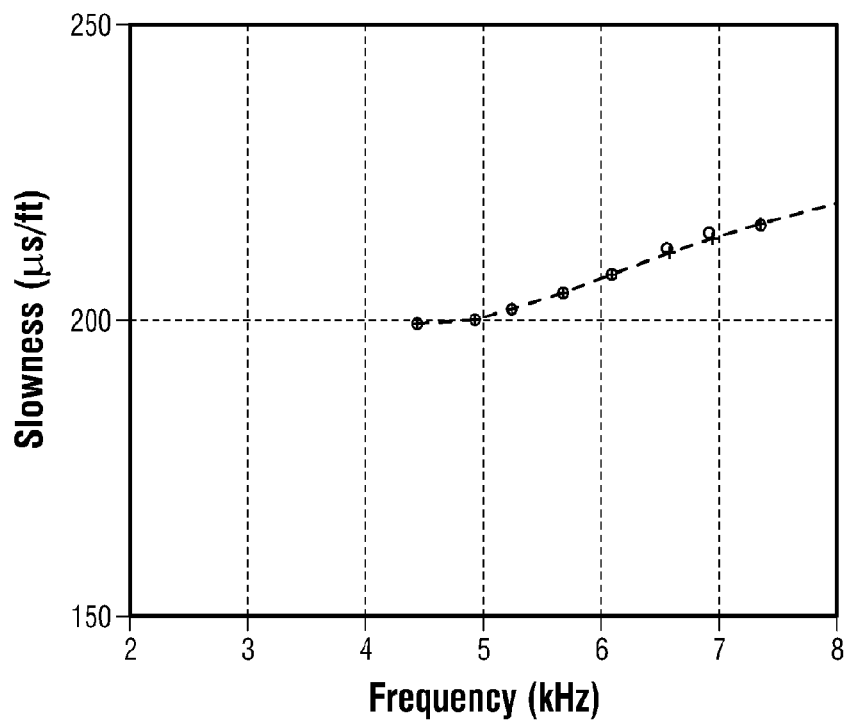

FIG. 6a: Measured dipole dispersion (circles) and reference dipole dispersion for a radially homogeneous formation (dashed blue line) before fracturing operation. Results are for depth B.

Figure 6B:
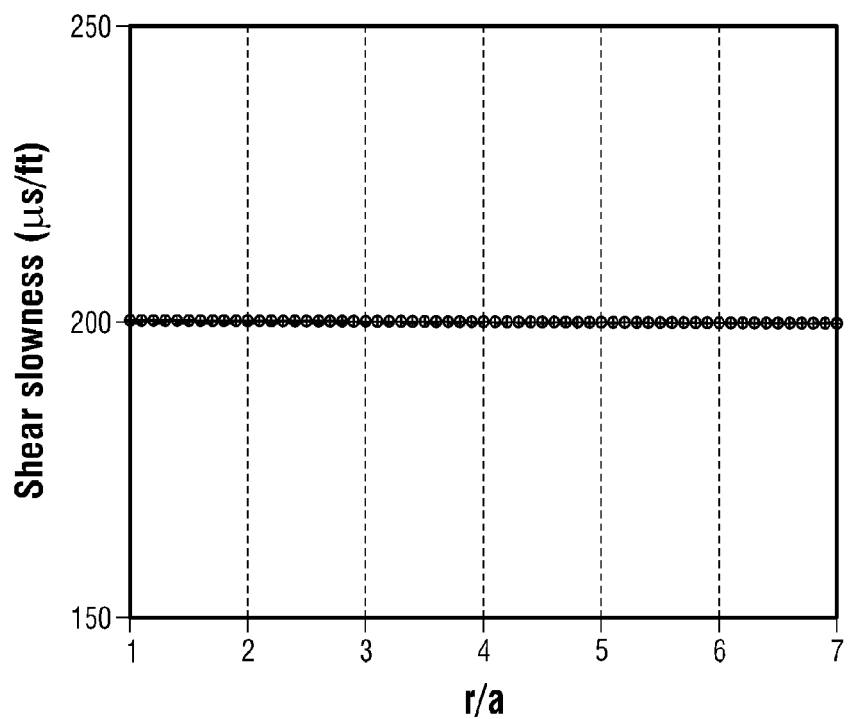

FIG. 6b: Inverted radial profile of the dipole shear slowness before fracturing operation at depth B.

Figure 7A:
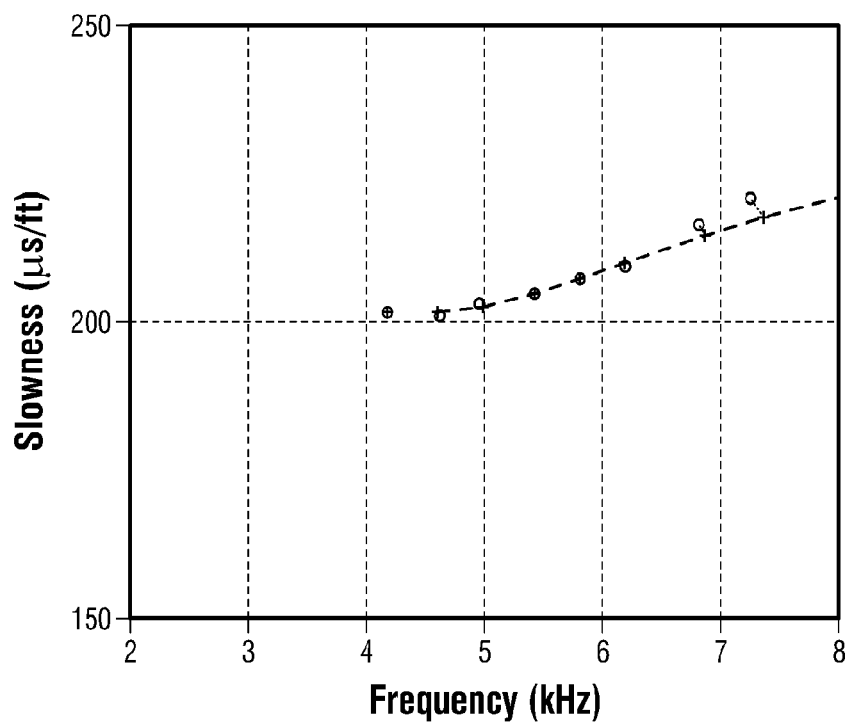

FIG. 7a: Measured fast-dipole dispersion (circles) and reference dipole dispersion (dashed blue line) at depth B.

Figure 7B:
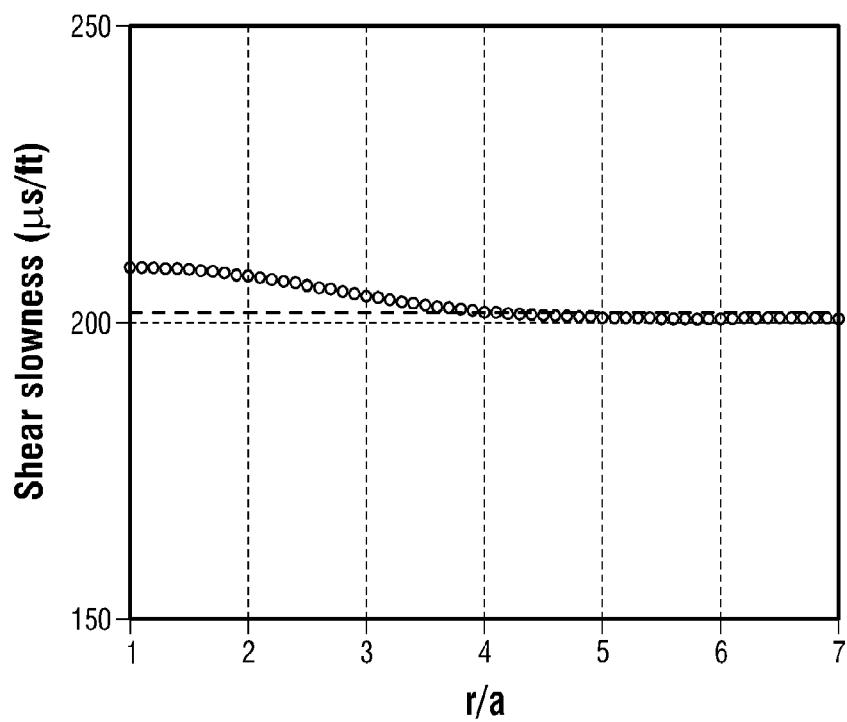

FIG. 7b: Inverted fast-dipole shear slowness obtained from the difference between the measured and reference dipole dispersions for a radially homogeneous formation. Results obtained after fracturing operation at depth B.

Figure 8A:
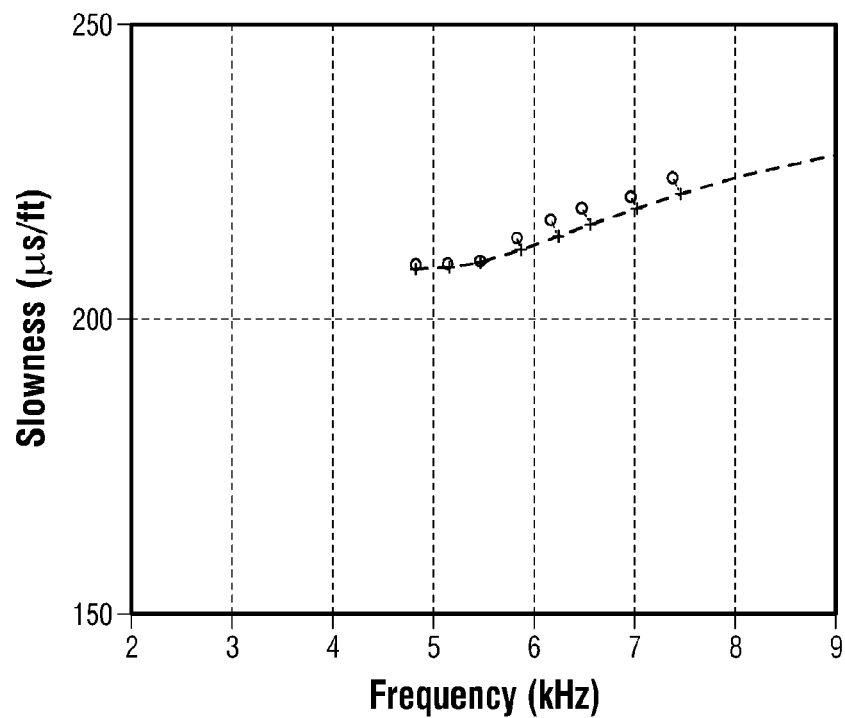

FIG. 8a: Measured slow-dipole dispersion (circles) and reference dipole dispersion (dashed blue line) at depth B.

Figure 8B:
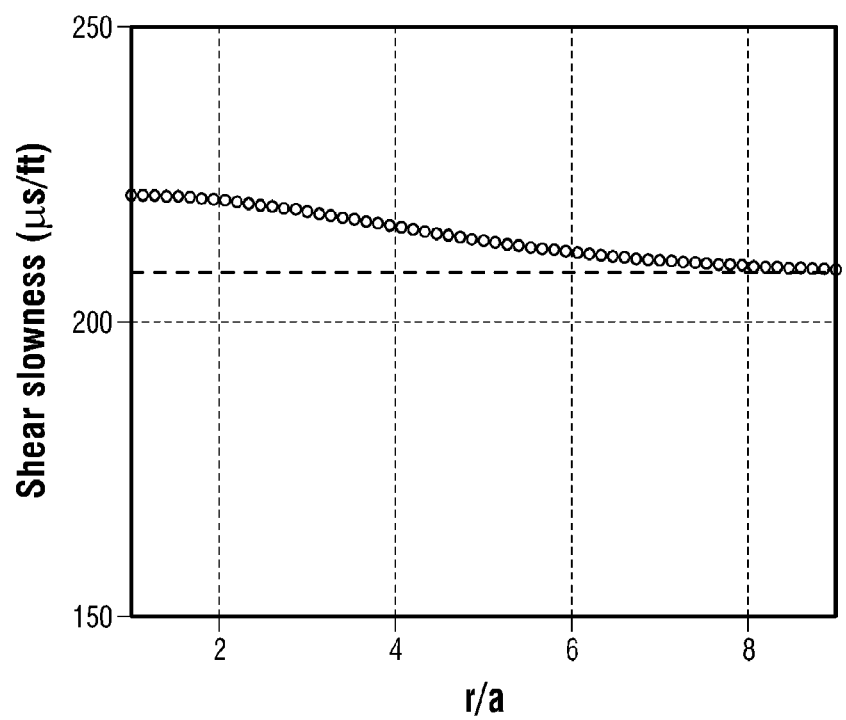

FIG. 8b: Inverted slow-dipole shear slowness obtained from the difference between the measured and reference dipole dispersions for a radially homogeneous formation. Results obtained after fracturing operation at depth B.

Figure 9:
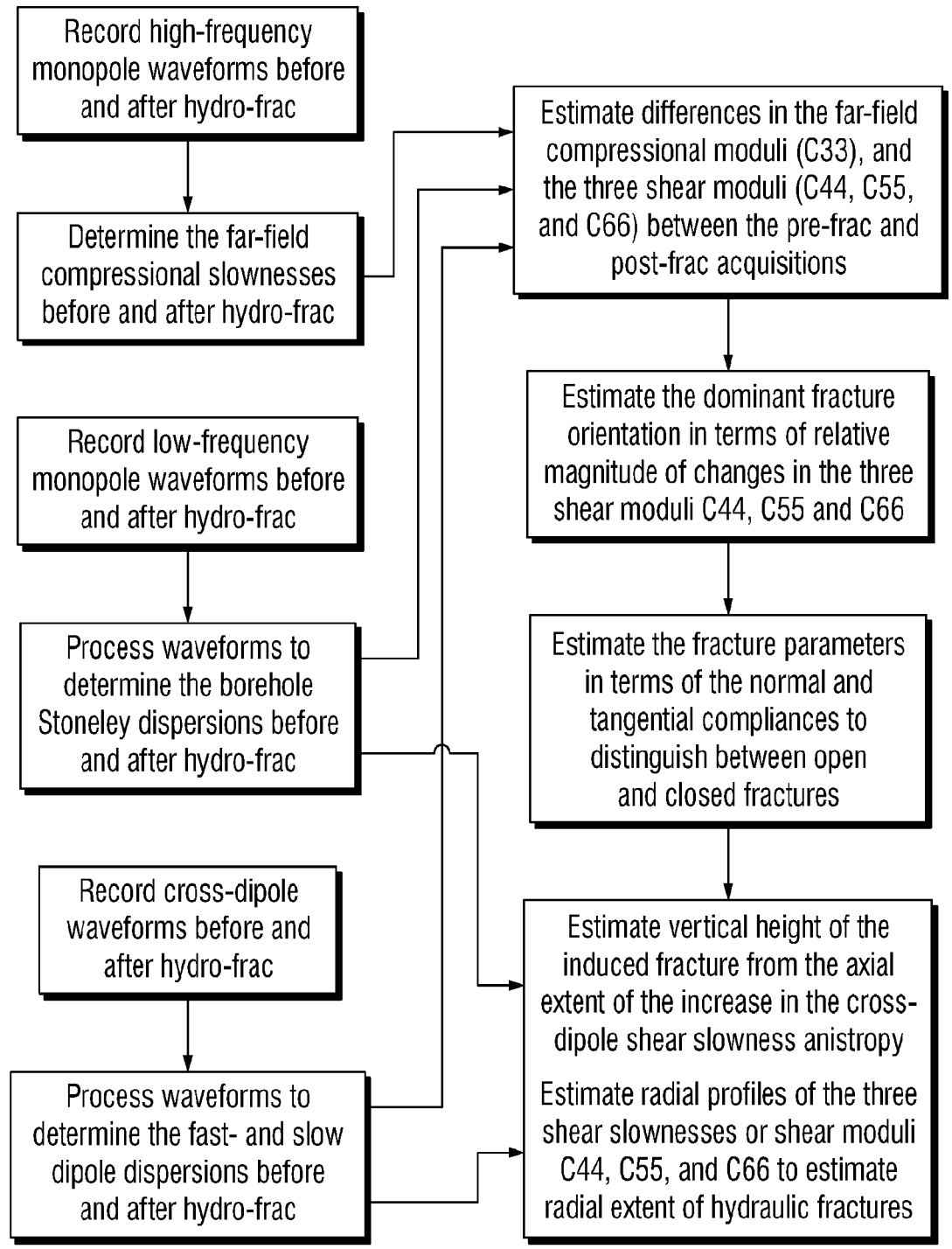

FIG. 9: Flow chart for the detection and characterization of hydraulic fractures using cased-hole sonic data processing and analysis.

Figure 10:
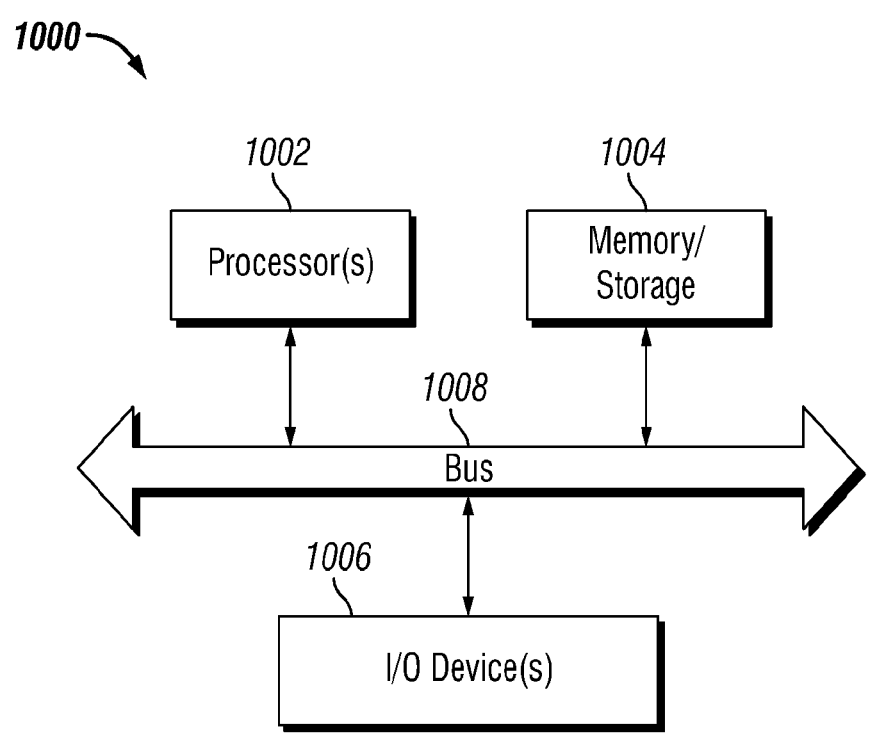

FIG. 10 illustrates an example computing device 1000 that can be used to implement various described embodiments and techniques of the present invention in whole or in part

DETAILED DESCRIPTION

Generally, hydraulic fractures are characterized using borehole sonic data, and more specifically, we estimate changes in the formation tangential compliances in the two orthogonal borehole axial planes and the borehole cross-sectional plane, and the normal compliance along the borehole axis. In accordance with one embodiment, relative changes in the formation tangential and normal compliances between pre-frac and post-frac can be used to identify the dominant orientation of hydraulically-induced fractures. In accordance with one embodiment, vertical height of the induced fracture can be inferred from the axial extent of increase in the cross-dipole shear slowness anisotropy. Additionally, in accordance with an embodiment, radial extent of fractures can be estimated from the radial profiles of the three shear moduli estimated from the cased-hole sonic data. A qualitative indicator of open versus closed fractures can be estimated from relative magnitudes of the normal and tangential compliances of the fractured rock.

The presence of a set of aligned fractures in a host rock matrix causes the shear stiffness of the composite structure smaller in the plane of fracture than that in the perpendicular direction. This implies that there is an increase in the tangential compliance parallel to the fracture plane relative to the normal compliance of the fractured material. Changes in the tangential compliance relative to the normal compliance of a fractured rock are related to corresponding changes in the effective shear moduli referred to the fracture plane and the other two orthogonal planes defining a set of orthogonal axes. Changes in the effective shear moduli can be estimated in terms of differences in the shear moduli of the composite material before and after the introduction of such fractures in the rock matrix.

An inversion algorithm inverts measured sonic velocities or slownesses estimated from the sonic data acquired in a cased hole in fast formations in the presence of a good bond between the casing, cement, and formation to estimate compressional and shear stiffnesses in the far-field that extends beyond the near-wellbore altered annulus.

A workflow for the characterization of hydraulically induced fractures through perforations in a cased hole includes acquiring sonic data before and after fracturing operation. Cased-hole sonic data are processed to obtain the far-field compressional slowness, and the two dipole shear slownesses in the two orthogonal axial planes and the Stoneley shear slowness in the borehole cross-sectional plane. Differences in the corresponding compressional modulus and the three shear moduli between the pre-frac and post-frac data acquisitions provide indications of the dominant fracture orientation, and fracture parameters in terms of normal and tangential compliances associated with the introduced fractures. The dominant fracture orientation is inferred from the relative magnitude of changes in the three shear moduli. An increase in the axial extent of azimuthal shear slowness or cross-energy anisotropy is an indicator of vertical height of induced fractures. The formation parameters in the pre-frac state of the rock define the baseline reference of the rock state prior to the introduction of any hydraulically induced fractures. Relative magnitudes of the normal and tangential compliances provide indications of open versus closed fractures. Significant differences between the normal and tangential compliances of the fractured formation suggest that these are open fractures. The height of the induced fracture is estimated from the axial extent of increase in the cross-dipole shear slownesses after hydraulic fracturing operation from the initial state before fracturing. The radial extent or width of the induced fracture can be inferred from an increase in the radial extent of cross-dipole shear slowness profiles.

A workflow to assess the orientation and radial extent of induced fractures is recited, wherein said workflow consists of cased-hole sonic data acquired before and after hydraulic fracturing operation. Processing and inversion of cased-hole sonic data is based on algorithms herein that account for the presence of a sonic tool structure as well as steel casing bonded with the formation through a cement annulus. These algorithms output the far-field formation compressional slowness, dipole shear slownesses in the two orthogonal axial planes, and a third shear slowness in the borehole cross-sectional plane obtained from the inversion of Stoneley data. These slownesses can be converted into a compressional modulus along the borehole axis, and three shear moduli in the two orthogonal borehole axial planes and the borehole cross-sectional plane.

Axial extent of increase in the cross-dipole shear anisotropy caused by hydraulically induced fractures parallel to the borehole axial plane is an indicator of the height of the induced fractures. The radial width of the induced fractures can be estimated from the radial extent of dipole shear slownesses above and beyond that existed before the fracturing operation.

Changes in the effective elastic moduli of fractured rock can be related to increases in the normal and tangential compliances of a rotationally invariant set of aligned fractures. The orientation of such aligned fractures is defined by the normal to the fracture plane. Aligned fractures are assumed to be rotationally invariant about its normal. The normal and tangential compliances are generally perpendicular and parallel to the fracture plane, respectively.

A single set of rotationally invariant fractures in a host rock matrix can be described in terms of its normal compliance $Z_N$ and tangential compliance $Z_T$. These are two non-zero real compliances that are also dependent on stresses applied to the composite structure of fractures in a rock matrix. The compliance matrix of a fractured rock can then be expressed as (Schoenberg and Sayers, Geophysics, vol. 60(1), 204-211, 1995, which is herein incorporated by reference) follows.

$$Z_{ij} = Z_N n_i n_j + Z_T(\delta_{ij} - n_i n_j) = Z_T \delta_{ij} + (Z_N - Z_T) n_i n_j \quad (1)$$

where the fracture normal $n_i$ defines the fracture orientation, and $\delta_{ij}$ denotes the Kronecker delta. Incremental changes in the compliance tensor of a rock matrix with a single set of rotationally invariant fractures can be expressed as $$s^{frac}_{ijkl} = \frac{Z_T}{4}(\delta_{ik} n_l n_j + \delta_{jk} n_i n_l + \delta_{il} n_k n_j + \delta_{jl} n_k n_i) + (Z_N - Z_T) n_i n_j n_k n_l, \quad (2)$$

where we have introduced certain relationships between the $4^{th}$-rank tensor $s_{ijkl}$ and the compressed compliance matrix $S_{pq}$ as shown below (Nye, 1985, herein incorporated by reference)

$s_{ijkl} \rightarrow S_{pq}$, when both $p$, $q$ are 1, 2, or 3, $2s_{ijkl} \rightarrow S_{pq}$, when one of $p$, $q$ is 4, 5, or 6, $4s_{ijkl} \rightarrow S_{pq}$, when both $p$, $q$ are 4, 5, or 6 $\quad (3)$ As an illustrative example, a single set of vertically aligned fractures whose normal is parallel to the $X_1$-axis, i.e., $n_i = (1, 0, 0)$, the three non-zero compliance tensor elements are related to the corresponding compliance matrix (6×6) elements as shown below $s^{frac}_{1111} = S_{11} = Z_N$, $4s^{frac}_{1313} = S_{55} = Z_T$, $4s^{frac}_{1212} = S_{66} = Z_T \quad (4)$ The presence of a single set of fractures in an isotropic rock matrix introduces an increase in the compliance matrix given by $$\Delta S(6 \times 6) = \begin{pmatrix} Z_N & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & Z_T & 0 \\ 0 & 0 & 0 & 0 & 0 & Z_T \end{pmatrix}. \quad (5)$$

Therefore, a single set of fractures with its normal parallel to the $X_1$-axis embedded in an isotropic rock matrix makes the composite structure exhibit a transversely isotropic (TI) anisotropy with its symmetry axis parallel to the $X_1$-axis.

The compliance matrix of an isotropic host rock matrix can be expressed in terms of the Lame moduli $\lambda_b$ and $\mu_b$ as given below $$S(6 \times 6) = \quad (6)$$

$$\begin{pmatrix} \frac{\lambda_b + \mu_b}{\mu_b\left(3\lambda_b + 2\mu_b\right)} & \frac{\lambda_b}{2\mu_b\left(3\lambda_b + 2\mu_b\right)} & -\frac{\lambda_b}{2\mu_b\left(3\lambda_b + 2\mu_b\right)} & 0 & 0 & 0 \\ & \frac{\lambda_b + \mu_b}{\mu_b\left(3\lambda_b + 2\mu_b\right)} & \frac{\lambda_b}{2\mu_b\left(3\lambda_b + 2\mu_b\right)} & 0 & 0 & 0 \\ & & \frac{\lambda_b + \mu_b}{\mu_b\left(3\lambda_b + 2\mu_b\right)} & 0 & 0 & 0 \\ & & & \frac{1}{\mu_b} & 0 & 0 \\ & & & & \frac{1}{\mu_b} & 0 \\ \text{Symmetric} & & & & & \frac{1}{\mu_b} \end{pmatrix},$$

where the subscript b denotes that the quantity refers to the background material. Consequently, the compliance matrix for a single set of fractures in an isotropic rock matrix is given by the addition of equations (5) and (6).

The elastic stiffness matrix of a fractured system with its normal parallel to the $X_1$-axis, is obtained by inverting the compliance matrix and is given by $$C(6 \times 6) = \quad (7)$$

$$\begin{pmatrix} (\lambda_b + 2\mu_b)(1 - \delta_N) & \lambda_b(1 - \delta_N) & \lambda_b(1 - \delta_N) & 0 & 0 & 0 \\ & (\lambda_b + 2\mu_b)(1 - r_b^2 \delta_N) & \lambda_b(1 - r_b \delta_N) & 0 & 0 & 0 \\ & & (\lambda_b + 2\mu_b)(1 - r_b^2 \delta_N) & 0 & 0 & 0 \\ & & & \mu_b & 0 & 0 \\ & & & & \mu_b(1 - \delta_T) & 0 \\ \text{Symmetric} & & & & & \mu_b(1 - \delta_T) \end{pmatrix},$$

where $r_b = \lambda_b/(\lambda_b + 2\mu_b)$, and the non-dimensional fracture parameters $\delta_N$ and $\delta_T$ are given by $$\delta_N = -\frac{\Delta C_{11}}{\lambda_b}, \delta_T = -\frac{\Delta C_{55}}{\mu_b} = -\frac{\Delta C_{66}}{\mu_b}, \Delta C_{44} = 0. \quad (8)$$

Similarly, the elastic stiffness matrix of a fractured system with its normal parallel to the $X_3$-axis can be expressed as $$C(6 \times 6) = \begin{pmatrix} (\lambda_b + 2\mu_b)(1 - r_b^2 \delta_N) & \lambda_b(1 - r_b \delta_N) & \lambda_b(1 - \delta_N) & 0 & 0 & 0 \\ & (\lambda_b + 2\mu_b)(1 - r_b^2 \delta_N) & \lambda_b(1 - \delta_N) & 0 & 0 & 0 \\ & & (\lambda_b + 2\mu_b)(1 - \delta_N) & 0 & 0 & 0 \\ & & & \lambda_b(1 - \delta_T) & 0 & 0 \\ & & & & \lambda_b(1 - \delta_T) & 0 \\ \text{Symmetric} & & & & & \mu_b \end{pmatrix}, \quad (9)$$

where the non-dimensional fracture parameters $\delta_N$ and $\delta_T$ for fractures parallel to the $X_1$-$X_2$ plane are now given by $$\delta_N = -\frac{\Delta C_{33}}{\lambda_b}, \delta_T = -\frac{\Delta C_{44}}{\mu_b} = -\frac{\Delta C_{55}}{\mu_b}, \Delta C_{66} = 0. \quad (10)$$

FIG. 1 shows schematic diagram of a set of vertically aligned fractures oriented along the azimuth NE45. FIG. 1 is a schematic to illustrate an inversion of the cased-hole Stoneley and dipole dispersions for the three shear moduli.

The far-field shear moduli estimated before and after fracturing operation can be used to estimate the dominant fracture orientation and to distinguish open versus closed fractures. To this end, we have developed an inversion algorithm that estimates the far-field shear modulus in the borehole cross-sectional plane from the measured Stoneley; and the shear moduli in the two orthogonal borehole axial planes from the cross-dipole dispersions in a cased-hole. These planes are illustrated by FIG. 2.

The borehole Stoneley or flexural dispersion in a cased-hole surrounded by an isotropic formation can be calculated in terms of the following.

a. The casing inner and outer radii;

b. The casing material mass density, bulk, and shear moduli;

c. The borehole fluid mass density, and bulk modulus;

d. The calibrated sonic tool parameters for the Stoneley and flexural dispersions; and e. The formation mass density, bulk, and shear moduli.

One suitable way to estimate the formation shear in the borehole cross-sectional plane is based on minimizing differences between the measured and model predicted Stoneley dispersions in a chosen bandwidth by varying the formation shear modulus for a homogeneous and isotropic formation, while all other system parameters are obtained from other sources.

Braunisch et al., (2000; 2004, herein incorporated by reference) have described an efficient inversion technique for obtaining the formation shear modulus using either the borehole Stoneley or dipole flexural dispersions. This technique attempts to minimize a cost function derived directly from the determinant of boundary condition matrix obtained after satisfying all continuity conditions at cylindrical boundaries of an axially invariant waveguide. They have introduced a concept of guidance mismatch minimization by varying the unknown formation constitutive parameter (shear modulus) at a range of frequencies $\omega_i$ and corresponding axial wavenumbers $k_{zi}$ that defines the dispersion for a given mode of interest. This guidance mismatch can be defined by $$\|\bar{e}(\bar{x})\|^2 = \sum_{i=1}^{M} |D(k_{zi}, \omega_i, \bar{x})|^2, \quad (7)$$

where $D(k_{zi}, \omega_i, X)$ denote the boundary condition determinant which is a function of the material parameters (X) of the cylindrical layers that constitutes the waveguide for a chosen pair of axial wavenumber $k_{zi}$ and frequency $\omega_i$. When a given set of material parameters together with a pair of axial wavenumber and frequency causes the boundary condition determinant to vanish, that pair of axial wavenumber and frequency is a point on the modal dispersion curve. The inverse problem consists of estimating one or more material parameters, such as the formation shear modulus and borehole fluid bulk modulus for a sequence of points on the borehole dispersion that satisfies the characteristic boundary condition determinant $D(k_{zi}, \omega_i, X) = 0$ (Additional details are available in U.S. Provisional Patent Application Ser. No. 61/255,476 filed 27 Oct. 2009 which has been filed internationally with a serial number of PCT/IB2010/002733, titled *Method and apparatus to process measurements associated with drilling operations*", by H-P. Valero, S. Bose, J. Yang, B. Sinha, T. Habashy, and A. Hawthorn, both of which are herein incorporated by reference).

It should be noted that the formation shear modulus $C_{66}$ in the borehole cross-sectional plane can also be estimated from other techniques, such as, torsional wave logging.

Identification of Fracture Orientation and Open Versus Closed Fractures

The presence of hydraulic fractures in a formation causes changes in the effective elastic moduli of the material. In accordance with one aspect, the fracture orientation can be defined by a normal to the plane of aligned fractures. Changes in the compressional and shear elastic moduli of the formation introduced by the hydraulic fracturing operation are related to corresponding changes in the normal ($Z_N$) and tangential ($Z_T$) compliances of a rotationally invariant set of aligned fractures. Large differences between the normal and tangential compliances are indicators of open fractures, whereas very small differences imply nearly closed fractures (Schoenberg and Sayers, 1995, herein incorporated by reference). The radial extent of fractures can be inferred from radial profiles of the three shear moduli obtained from the cased-hole Stoneley and cross-dipole dispersions.

Insofar as the fractures are aligned with one of the borehole axial or cross-sectional planes, the sonic data acquired from a wellbore parallel to the $X_3$-axis would exhibit TI-symmetry. Under these circumstances, relative magnitudes of the three far-field shear moduli can be used to infer the dominant plane of induced fractures according to the following inequalities:

If $C_{44} > C_{55}$; and $C_{55} = C_{66}$, implies that vertical fractures are parallel to the $X_2$-$X_3$ plane and the fracture normal is parallel to the $X_1$-axis.

If $C_{55} > C_{44}$; and $C_{44} = C_{66}$, implies that vertical fractures are parallel to the $X_3$-$X_1$ plane and the fracture normal is parallel to the $X_2$-axis.

If $C_{66} > C_{44}$; and $C_{44} = C_{55}$, implies that vertical fractures are parallel to the $X_1$-$X_2$ plane and the fracture normal is parallel to the $X_3$-axis.

If $C_{66} < C_{44}$; and $C_{44} = C_{55}$, in a porous sand reservoir, could also imply that the horizontal fluid mobility parallel to the $X_1$-$X_2$ plane is larger than the vertical mobility.

Next, we describe a workflow to estimate changes in the normal and tangential compliances of a fractured formation using the compressional and shear slownesses obtained from the cased-hole sonic data. The compressional slowness log in cased-holes may be obtained from the STC processing of monopole waveforms using a casing filter. The far-field dipole shear slownesses may be obtained from low-frequency asymptotes of dipole flexural dispersions. They provide shear moduli $C_{44}$ and $C_{55}$ in the two orthogonal borehole axial planes. The third shear modulus $C_{66}$ in the borehole cross-sectional plane may be obtained from the measured Stoneley dispersion after minimizing differences between the measured and modeled dispersions for a homogeneous and isotropic formation that accounts for the tool presence and casing effects. We minimize differences between the measured and modeled Stoneley dispersions over a bandwidth that exhibits largest radial depth of investigation.

Inversion Model

Estimation of the fracture orientation and fracture parameters related to the normal and tangential compliances consists of the following:
1. Record low-frequency monopole waveforms to obtain the borehole Stoneley dispersion
2. Record high-frequency monopole waveforms to obtain the far-field compressional slowness
3. Record cross-dipole waveforms and process them to obtain the fast-shear azimuth
4. Rotate cross-dipole waveforms to obtain the fast-dipole and slow-dipole dispersions
5. Process the borehole Stoneley dispersion to obtain the far-field shear modulus in the borehole cross-sectional plane
6. Process the fast- and slow-dipole dispersions to obtain the far-field shear moduli in the two orthogonal borehole axial planes
7. Estimate differences in the far-field compressional and the three shear moduli between the pre-frac and post-frac acquisitions
8. Estimate the dominant fracture orientation in terms of relative magnitude of changes in the three shear moduli
9. Estimate the fracture parameters in terms of the normal and tangential compliances
10. Compare radial profiles of cross-dipole shear slownesses before and after fracturing.
11. Increase in the radial alteration after fracturing is an indicator of radial extent of vertically aligned fractures
12. Axial extent of increase in the cross-dipole shear slowness dispersion provides an estimate of the height of the induced fracture parallel to the borehole axial plane.

Figure 3:
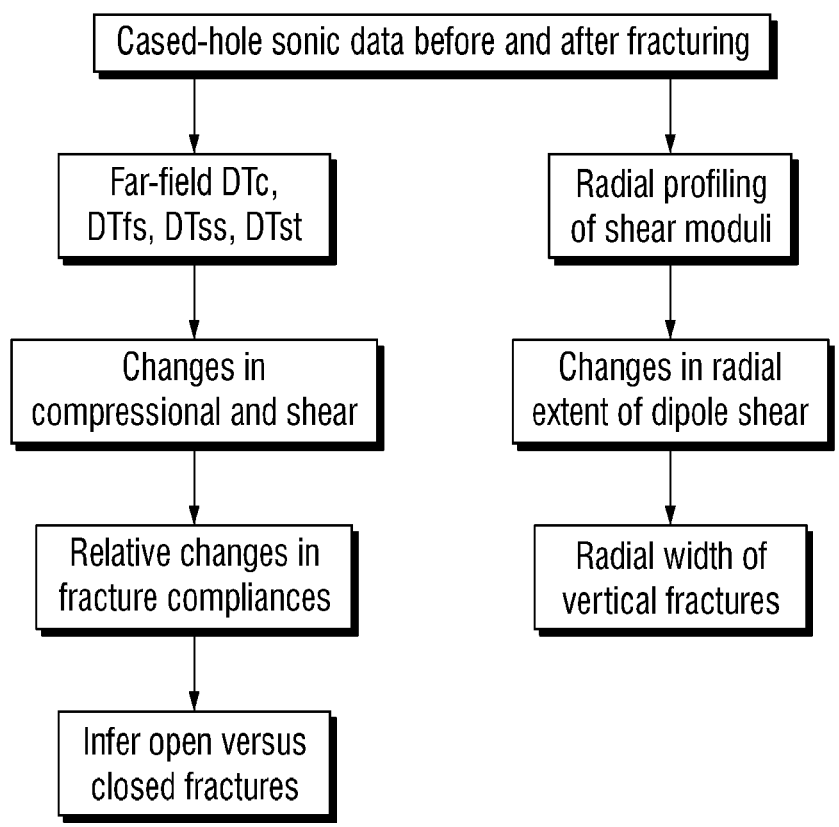
FIG. 3 is a flow diagram of steps of an embodiment.

One flowchart for accomplishing these methods is provided by FIG. 3. An additional flowchart is provided by FIG. 9. A procedure for obtaining radial profiles of cross-dipole shear slownesses before and after fracturing is described in the U.S. Pat. No. 6,611,761 B2, Aug. 26, 2003, "Sonic well logging for radial profiling", by B. K. Sinha, R. Burridge, and M. R. Kane which is herein incorporated by reference.

A procedure for obtaining the axial extent of cross-dipole shear slowness anisotropy before and after fracturing is described in the U.S. Pat. No. 6,718,266 issued Apr. 6, 2004, "Determination of dipole shear anisotropy of earth formations" (DATC/DAFC), by B. K. Sinha, S. Bose, and X. Huang which is further incorporated by reference.

EXAMPLE

Sonic data acquired before and after the hydraulic fracture operation in a cased-hole parallel to the vertical $X_3$-axis can be used to estimate the height of vertical fractures, dominant orientation of induced fractures, radial extent of fractures, and to distinguish between open and closed fractures. Both monopole and cross-dipole waveforms recorded over a wide bandwidth are processed to obtain the far-field compressional slowness, and the borehole Stoneley, the fast-dipole and slow-dipole dispersions that provide slowness as a function of frequency for such dispersive modes. Cross-dipole sonic data processing can identify increase in the azimuthal shear slowness anisotropy over a given depth interval as an indicator of vertical height of induced fractures in a vertical wellbore in a consolidated sand reservoir. Cross-dipole sonic data can identify the presence of vertically aligned fractures parallel to the borehole axial plane.

Inversion of the Stoneley dispersion over a select bandwidth yields the far-field shear modulus in the borehole cross-sectional plane. Similarly, the fast-dipole and slow-dipole dispersions can be inverted to obtain the far-field shear modulus $C_{44}$ (in the $X_2$-$X_3$ plane) and $C_{55}$ (in the $X_3$-$X_1$ plane) in the two orthogonal borehole axial planes.

A sensitivity analysis of Stoneley dispersion in a well-bonded cased hole in fast formations suggests that the Stoneley dispersion exhibits sensitivity to the far-field shear modulus C66 over a bandwidth of approximately 1 to 3 kHz. Radial distributions of modal amplitudes also indicate that the Stoneley data exhibits largest radial depth of investigation over a bandwidth of approximately 1 to 3 kHz.

Estimation of Fracture Parameters Below a Perforation Interval

As an illustrative, non-limiting example, we analyze wellbore sonic data acquired before and after fracturing operation at a depth below a perforation interval as shown in FIG. 4a. Table 1 contains a summary of the compressional and three shear slownesses. At this depth cross-dipole shear slownesses are substantially the same implying no azimuthal shear slowness anisotropy before the fracturing operation. However, cross-dipole shear slownesses exhibit a significant increase in shear slowness anisotropy of about 7% after the fracturing operation. Both the Stoneley shear slowness in the borehole cross-sectional plane (DTcs) and the compressional slowness (DTc) along the borehole axis also show discernible increase implying the presence of fractured formation.

TABLE 1

Summary of cased-hole compressional and shear slownesses

| Depth B | DTc (μs/ft) | DTcs (μs/ft) | DTfs (μs/ft) | DTss (μs/ft) |
|---|---|---|---|---|
| Pre-Frac | 96.93 | 200 | 199 | 199 |
| Post-Frac | 98.46 | 208 | 202 | 208 |

Table 2 contains compressional and shear moduli calculated from the slownesses shown in Table 1. Notice that the largest decrease in the shear modulus $C_{44}$ implies an increase in the tangential compliance in the $X_2$-$X_3$ plane. This observation suggests that the hydraulically induced fractures are largely parallel to the $X_2$-$X_3$ plane.

TABLE 3

Summary of cased-hole compressional and shear moduli

| Depth B | $C_{33}$ (GPa) | $C_{66}$ (GPa) | $C_{55}$ (GPa) | $C_{44}$ (GPa) |
|---|---|---|---|---|
| Pre-Frac | 23.178 | 5.4441 | 5.499 | 5.499 |
| Post-Frac | 22.463 | 5.0334 | 5.3368 | 5.0344 |

To calculate the normal and tangential compliances, we follow the following steps:

1. The background shear modulus is the average of the three measured shear moduli $\mu_b = (C_{44} + C_{55} + C_{56})/3$.

2. The background Lame modulus $\lambda_b$ is then calculated from the equation shown below $\lambda_b = C_{33} - 2\mu_b$.

3. The non-dimensional fracture parameters $\delta_N$ and $\delta_T$ are computed from the following equations $$\delta_N = -\frac{\Delta C_{33}}{\lambda_b}, \delta_T = -\frac{\Delta C_{44}}{\mu_b}, \delta_T = -\frac{\Delta C_{55}}{\mu_b}, \delta_T = \frac{\Delta C_{66}}{\mu_b}.$$

4. The normal and tangential compliances are then calculated from the following equations $$Z_n = \frac{\delta_n}{(\lambda_b + 2\mu_b)(1 - \delta_N)}, \text{ and}$$

$$Z_T = \frac{\delta_T}{\mu_b(1 - \delta_T)}.$$

Note that changes in the three tangential compliances corresponding to changes in the shear moduli $C_{44}$, $C_{55}$, and $C_{66}$ are parallel to the orthogonal planes $X_2$-$X_3$, and $X_1$-$X_2$ respectively.

Table 3 displays the normal and three tangential compliances in the three orthogonal planes at depth 543 m after hydraulic fracturing operation.

TABLE 4

Summary of the normal and tangential compliances for a fractured rock

| Depth B | $Z_N$ (1/Pa) | $Z_T$ (1/Pa) | $Z_T$ (1/Pa) | $Z_T$ (1/Pa) |
|---|---|---|---|---|
| | −0.238e−11 | −1.27e−11 | −0.525e−11 | −1.43e−11 |
| | ($\delta_N$ = −0.0585) | ($\delta_T$ = −0.0749) | ($\delta_T$ = −0.0296) | ($\delta_T$ = −0.085) |

FIGS. 4b-1 to 4b-2 to 8b illustrate additional embodiments. FIG. 4b-1 to 4b-2 shows cross-dipole sonic data anisotropy processing results from an open-hole data before fracturing show negligibly small azimuthal shear anisotropy at the depth of subsequent analysis shown by the horizontal red arrow. The fast shear azimuth is approximately NW34 at depth B. FIGS. 4c-1 to 4c-2 provides results from the 3D-anisotropy module suggest the formation at depth A to be nearly isotropic in the open-hole environment before fracturing. A marginal amount of TI anisotropy with a small positive gamma is observed at depth B. FIG. 5a illustrates cased-hole (Pre-frac)—Measured Stoneley (in cyan), and cross-dipole dispersions (in red and blue) at depth B. FIG. 5b provides cased-hole (Post-frac)—Measured Stoneley (in cyan), and cross-dipole dispersions (in red and blue) at depth B. FIG. 5c is a comparison of the dipole flexural dispersions in the open-hole (in black), cased-hole (pre-frac) shown in blue, and cased-hole (post-frac) shown in red at depth B. Notice that changes in the cross-dipole flexural dispersions shown by the red and cyan curves after hydraulic fracturing from the blue curve corresponding to the pre-frac state can be inverted to estimate normal and tangential fracture compliances. FIG. 6a is measured dipole dispersion (circles) and reference dipole dispersion for a radially homogeneous formation (dashed blue line) before fracturing operation. Results are for depth B. FIG. 6b is inverted radial profile of the dipole shear slowness before fracturing operation at depth B. FIG. 7a illustrates measured fast-dipole dispersion (circles) and reference dipole dispersion (dashed blue line) at depth B. FIG. 7b is inverted fast-dipole shear slowness obtained from the difference between the measured and reference dipole dispersions for a radially homogeneous formation. Results obtained after fracturing operation at depth B. FIG. 8a provides measured slow-dipole dispersion (circles) and reference dipole dispersion (dashed blue line) at depth B. FIG. 8b is an inverted slow-dipole shear slowness obtained from the difference between the measured and reference dipole dispersions for a radially homogeneous formation. Results obtained after fracturing operation at depth 13.

In accordance with other aspects, FIG. 10 illustrates an example computing device 1000 that can be used to implement various described embodiments and techniques of the present invention in whole or in part. Computing device 1000 is only one non limiting example which may be utilized in conjunction with the present invention. The recitation of Computing device 1000 is for illustrative purposes and is not intended to be limiting on the scope of the present invention nor is it to be interpreted as having any dependency or requirement relating to any one of or any combination of components illustrated in the example Computing device 1000.

Computing device 1000 includes one or more processors or processing units 1002, one or more memory and/or storage components 1004, one or more input/output (I/O) devices 1006, and a bus 1008 that allows the various components and devices to communicate with one another.

Bus 1008 represents one or more of any of several types of bus structures, including a memory bus or memory controller, a peripheral bus, an accelerated graphics port, and a processor or local bus using any of a variety of bus architectures. Bus 1008 can include wired and/or wireless buses.

Memory/storage component 1004 represents one or more computer storage media. Component 1004 can include volatile media (such as random access memory (RAM)) and/or nonvolatile media (such as read only memory (ROM), Flash memory, optical disks, magnetic disks, and so forth). Component 1004 can include fixed media (e.g., RAM, ROM, a fixed hard drive, etc.) as well as removable media (e.g., a Flash memory drive, a removable hard drive, an optical disk, and so forth). Component 1004 can be accessible by a computing device 1000 and/or by one or more additional devices as shared memory/storage.

One or more input/output devices 1006 allow a user to enter commands and information to computing device 1000, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules, such as update and display module 112 above for instance. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer(s).

Although embodiments of the present invention have been described in language specific to structural features and/or preferred embodiments of methods, it is to be understood that such descriptions are not intended to be limiting in any way. Rather, the specific methods, features, system(s) and apparatus of the present application are solely exemplary implementations of the disclosed hydraulic fracture characterization using borehole sonic data. In particular, the entire workflow can be applied to the sonic data acquired before and after fracturing operation in an open-hole as well.

What is claimed is:

1. A method for assessing induced fractures in a subterranean formation, comprising:
   providing a sonic tool in a borehole surrounded by the subterranean formation, wherein the sonic tool comprises an acoustic source and a plurality of receivers;
   transmitting a sonic signal by the acoustic source before and after a hydraulic fracturing operation;
   acquiring sonic data by the plurality of receivers before and after the hydraulic fracturing operation, wherein the sonic data comprises Stoneley data and cross dipole data;
   calculating a shear modulus in a borehole cross-sectional plane from the Stoneley data;
   calculating two shear moduli in two orthogonal borehole axial planes from the cross dipole data;
   estimating changes in the shear modulus and the two shear moduli; and
   outputting the changes in the shear modulus and the two shear moduli to assess the induced fractures,
   wherein the borehore is a cased hole, and
   wherein the method further comprises using an algorithm that accounts for a distortion of a steel casing that is bonded with the formation through a cement annulus.

2. The method of claim 1, further comprising using an algorithm that accounts for a distortion of a sonic tool structure.

3. The method of claim 1, further comprising converting the moduli into a compressional modulus along the borehole axis.

4. The method of claim 1, further comprising converting the moduli into three shear moduli in the two orthogonal borehole axial planes and the borehole cross-sectional plane.

5. A method for assessing induced fractures in a subterranean formation, comprising:
   providing a sonic tool in a borehole surrounded by the subterranean formation, the sonic tool comprising an acoustic source and a plurality of receivers;
   transmitting a sonic signal by the acoustic source before and after fracturing;
   collecting sonic data before and after fracturing the formation wherein the sonic data comprises Stoneley data and cross dipole data;
   calculating a far-field shear modulus in a borehole cross-sectional plane and a far-field shear moduli in two orthogonal borehole axial planes from the Stoneley data and the cross dipole data;
   inferring open or closed status of a fracture from the far-field shear moduli in the borehole cross-sectional plane and two orthogonal borehole axial planes;
   estimating a radial width or height or both of a vertical fracture from the Stoneley data and the cross dipole data; and
   outputting the radial width or height or both of the vertical fracture to assess the induced fractures.

6. The method of claim 5, wherein the collecting comprises recording low-frequency monopole waveforms to obtain a borehole Stoneley dispersion.

7. The method of claim 5, wherein the collecting comprises recording high-frequency monopole waveforms to obtain a far-field compressional slowness.

8. The method of claim 5, wherein the collecting comprises recording cross-dipole waveforms and processing them to obtain the fast-shear azimuth.

9. The method of claim 5, wherein the calculating comprises rotating cross-dipole waveforms to obtain the fast-dipole and slow-dipole dispersions.

10. The method of claim 5, wherein the calculating comprises processing the borehole Stoneley dispersion to obtain the far-field shear modulus in the borehole cross-sectional plane.

11. The method of claim 5, wherein the calculating comprises processing the fast- and slow-dipole dispersions to obtain the far-field shear moduli in the two orthogonal borehole axial planes.

12. The method of claim 5, wherein the calculating comprises estimating differences in the far-field compressional and the three shear moduli between the pre-frac and post-frac acquisitions.

13. The method of claim 5, wherein the calculating comprises estimating the dominant fracture orientation in terms of relative magnitude of changes in the three shear moduli.

14. The method of claim 5, wherein the calculating comprises estimating the fracture parameters in terms of the normal and tangential compliances.

15. The method of claim 5, wherein the calculating comprises comparing radial profiles of cross-dipole shear slownesses before and after fracturing.

16. The method of claim 5, wherein the calculating comprises estimating an increase in the radial alteration after fracturing as an indicator of radial extent of vertically aligned fractures.

17. The method of claim 5, wherein the estimating comprises an axial extent of increase in the cross-dipole shear slowness dispersion.

18. The method of claim 5, wherein the sonic data is open hole sonic data or cased hole sonic data.

\* \* \* \* \*